United States Patent [19]

Tanabe et al.

[11] Patent Number: 5,152,138
[45] Date of Patent: Oct. 6, 1992

[54] EXHAUST SYSTEM FOR SIDEWAY-MOUNTED ENGINE

[75] Inventors: Koji Tanabe; Mamoru Tsumori; Fukuichi Yokogawa; Masao Sugiyama; Yasushi Zaiki, all of Hiroshima, Japan

[73] Assignees: Mazda Motor Corporation; Yumex Corporation, both of Hiroshima, Japan

[21] Appl. No.: 833,916

[22] Filed: Feb. 11, 1992

[30] Foreign Application Priority Data

Feb. 25, 1991 [JP] Japan .................................. 3-53430
Dec. 13, 1991 [JP] Japan .................................. 3-330882

[51] Int. Cl.⁵ .................................................. F01N 7/08
[52] U.S. Cl. ........................................... 60/313; 60/323
[58] Field of Search .......................... 362/313, 312, 323; 181/240

[56] References Cited

U.S. PATENT DOCUMENTS 4,831,823  5/1989  Ueda ..................................... 60/313

FOREIGN PATENT DOCUMENTS 0201925  11/1984  Japan ................................. 60/313
62-67920  6/1987  Japan .................................. 60/313

Primary Examiner—Ira S. Lazarus
Assistant Examiner—L. Heyman
Attorney, Agent, or Firm—Sixbey, Friedman, Leedom & Ferguson

[57] ABSTRACT

An engine has first and second cylinder rows substantially parallel to each other and is mounted sideways so that the cylinder rows are arranged side by side in the longitudinal direction of the vehicle body with the first cylinder row disposed forward of the second cylinder row. An exhaust system for the engine has first and second exhaust pipes. The first exhaust pipe is connected to the cylinders in the first cylinder row on the front side of the first cylinder row and is led rearward of the engine through a recess formed on the lower side of an oil pan of the engine which is positioned between the first and second cylinder rows. The second exhaust pipe is connected to the cylinders in the second cylinder row on the rear side of the second cylinder row, is once led forward into the recess of the oil pan and then turned rearward in the recess to extend rearward. The first and second exhaust pipes are merged into a common exhaust pipe at a junction in the rear of the engine.

5 Claims, 3 Drawing Sheets

F I G. 3
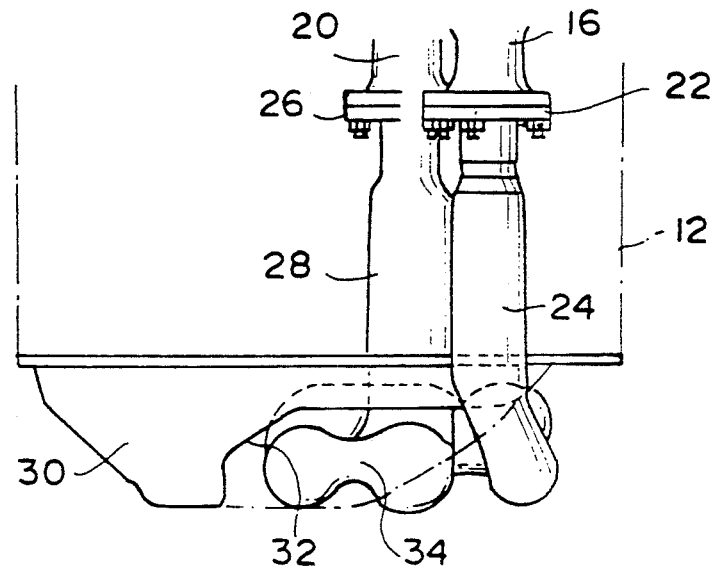
F I G. 4
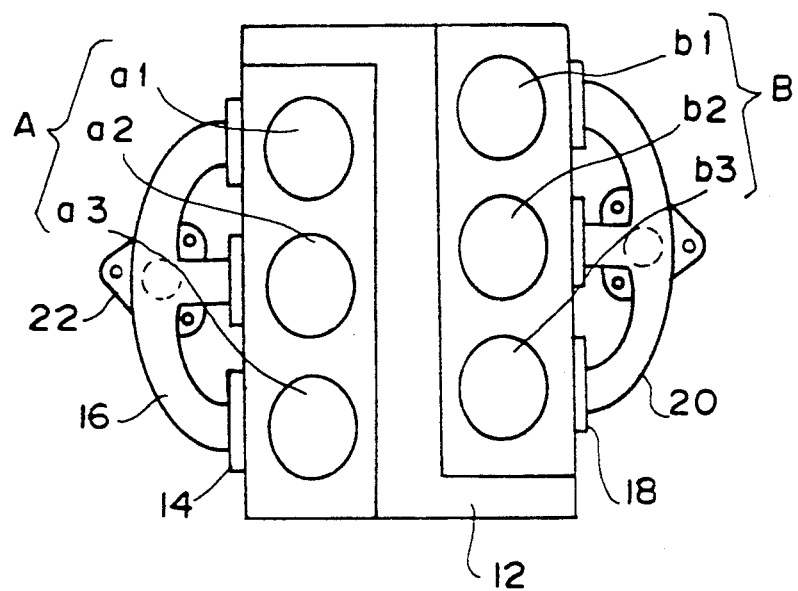

EXHAUST SYSTEM FOR SIDEWAY-MOUNTED ENGINE

BACKGROUND OF THE INVENTION

1. Field of the Invention

This invention relates to an exhaust system for a sideways-mounted engine having a pair of cylinder rows such as a V-type engine which has a pair of cylinder rows and is mounted sideways so that the cylinder rows are arranged side by side in the longitudinal direction of the vehicle body.

2. Description of the Prior Art

When an engine having a pair of cylinder rows such as a V-type engine or a horizontally opposed engine is mounted sideways on a vehicle body, the cylinder rows are opposed to each other in the longitudinal direction of the vehicle body. Accordingly, though an exhaust pipe which is connected to the rearward cylinder row on the rear side thereof may be simply led rearward, an exhaust pipe which is connected to the forward cylinder row on the front side thereof must be led rearward across the engine body, which makes difficult layout of the exhaust pipe.

As disclosed, for instance, in Japanese Unexamined Utility Model Publication No. 62(1987)67920, there has been proposed an exhaust system in which a recess is formed on the lower surface of an oil pan of the engine, the exhaust pipes for the forward and rearward cylinder rows are jointed together in the recess and a common exhaust pipe is connected to the junction of the exhaust pipes and extends rearward. In this engine, by jointing the exhaust pipes in the recess of the oil pan, a compact layout of the exhaust pipes is realized and a large road clearance is obtained.

When the V-type engine or the horizontally opposed engine is mounted sideways, it is preferred that the exhaust pipes for the forward and rearward cylinder rows be as long as possible in order to prevent exhaust interference between the cylinders and be equal to each other in order to equalize exhaust resistance.

The conventional exhaust system described above where the exhaust pipes for the respective cylinder rows are jointed in the recess formed in the oil pan just below the engine is disadvantageous in that the lengths of the respective exhaust pipes, i.e., the lengths between the junction of the respective exhaust pipes and the junctions of the respective exhaust pipes to the respective cylinder rows cannot be sufficiently long, and accordingly, exhausts of the different cylinders interfere with each other to greatly increase the exhaust resistance at the junction of the respective exhaust pipes.

SUMMARY OF THE INVENTION

In view of the foregoing observations and description, the primary object of the present invention is to provide an exhaust system for a sideway-mounted engine having a pair of cylinder rows in which the exhaust pipes for the respective cylinder rows can be equal to each other and can be sufficiently long to prevent exhaust interference.

In the exhaust system in accordance with the present invention, the exhaust pipe which is connected to the forward cylinder row on the front side thereof is led rearward across the engine through a recess formed on the lower side of an oil pan of the engine while the exhaust pipe which is connected to the rearward cylinder row on the rear side thereof is once led into the recess and then bent rearward to extend rearward, and the exhaust pipes are jointed together in the rear of the vehicle body.

Preferably the exhaust pipes are communicated with each other by way of a communicating pipe in the recess on the oil pan.

In the exhaust system of the present invention, since the exhaust pipe for the rearward cylinder row is once led forward and then bent rearward into a U-shape and is jointed with the exhaust pipe for the forward cylinder row in the rear of the vehicle body, the exhaust pipe for the rearward cylinder row can be sufficiently long as well as the exhaust pipe for the forward cylinder row and the exhaust pipes can be equal to each other in length, whereby exhaust interference can be greatly suppressed and the exhaust pipes can be substantially equal to each other in exhaust resistance.

Further, when the exhaust pipes are communicated with each other by way of the communicating pipe in the recess of the oil pan, exhaust noises in the exhaust pipes mutually interfere and are suppressed.

BRIEF DESCRIPTION OF THE DRAWINGS

FIG. 3 is a front view of the same, and FIG. 4 is a schematic plan view showing an example of an engine to which the exhaust system of the embodiment is applied.

DESCRIPTION OF THE PREFERRED EMBODIMENT

Figure 1:
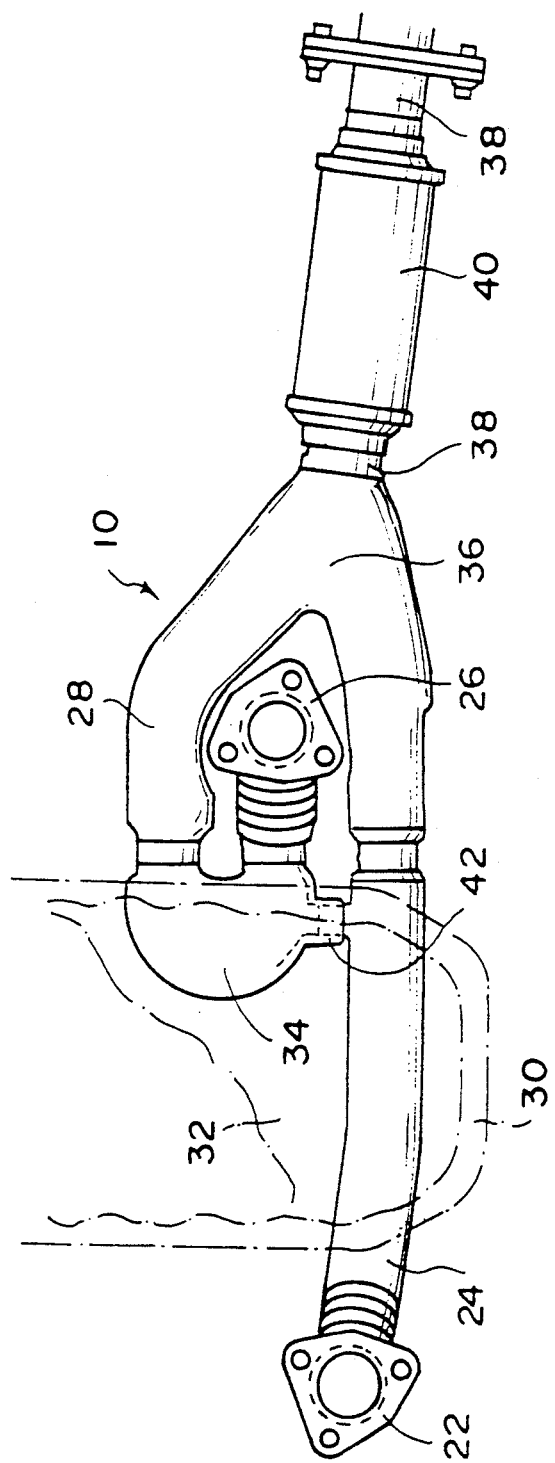
FIG. 1 is a plan view showing an important part of an exhaust system in accordance with an embodiment of the present invention.

In FIG. 4, a V-6 engine 12 to which an exhaust system 10 in accordance with an embodiment of the present invention is applied has first and second cylinder rows A and B which respectively comprise three cylinders a1, a2 and a3 and b1, b2 and b3. The engine 12 is mounted sideways on a vehicle body so that the respective cylinder rows A and B extend in the transverse direction of the vehicle body and are opposed to each other in the longitudinal direction of the vehicle body with the first cylinder row A positioned forward of the second cylinder row B.

A first exhaust manifold 16 is connected to the cylinders a1 to a3 in the first cylinder row A by way of flanges 14 on the front side of the first cylinder row A, and a second exhaust manifold 20 is connected to the cylinders b1 to b3 in the second cylinder row B by way of flanges 18 on the rear side of the second cylinder row B. The first and second exhaust manifolds 16 and 20 are equal to each other in length.

A first exhaust pipe 24 is connected to the first exhaust manifold 16 by way of a flange 22 and exhaust gas from the cylinders a1 to a3 flows into the first exhaust pipe 24 through first exhaust manifold 16. A second exhaust pipe 28 is connected to the second exhaust manifold 20 by way of a flange 26 and exhaust gas from the cylinders b1 to b3 flows into the second exhaust pipe 28 through the second exhaust manifold 20.

Figure 2:
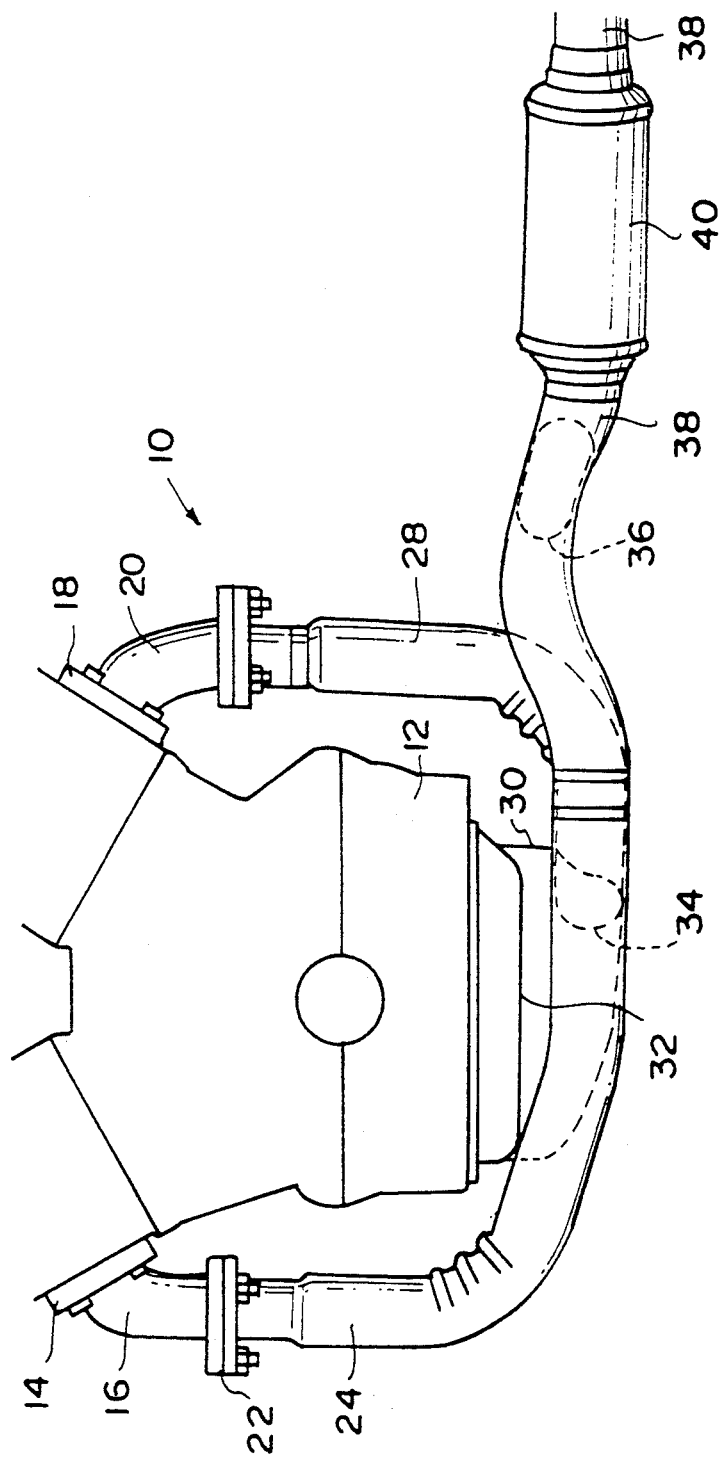
FIG. 2 is a side view of the part shown in FIG. 1.

As shown in FIGS. 1 to 3, the engine 12 has an oil pan 30 and the oil pan 30 is provided with a recess 32 formed on the lower side thereof. The first exhaust pipe 24 is once led downward and then led rearward across the engine 12 through the recess 32. The second exhaust pipe 28 is led downward, bent forward into the recess 32 and then turned rearward to extend rearward. That is, the second exhaust pipe 28 has a bight portion 34 which is bent forward below the flange 26 into the recess 32 of the oil pan 30 and then turned in a U-shape away from the first exhaust pipe 24. The rear end portions of the first and second exhaust pipes 24 and 28 merge into a common exhaust pipe 38 at a junction 36 in the rear of the engine 12. The first and second exhaust pipes 24 and 28 smoothly merge into the common exhaust pipe 38 at an acute angle. A catalytic convertor 40 is provided in the common exhaust pipe 38.

The first and second exhaust pipes 24 and 28 are communicated with each other by way of a communicating pipe 42 in the recess 32.

In the exhaust system 10 of this embodiment, exhaust gas discharged by the cylinders a1 to a3 in the first cylinder row A positioned forward of the second cylinder row B flows into the first exhaust pipe 24 through the first exhaust manifold 16 and exhaust gas discharged by the cylinders b1 to b3 in the second cylinder row B flows into the second exhaust pipe 28 through the second exhaust manifold 20. The exhaust gas flowing into the first and second exhaust pipes 24 and 28 flows into the common exhaust pipes 38 and is discharged outside passing through the catalytic convertor 40, silencer (not shown) and the like.

Since the second exhaust pipe 28 is once led forward and then turned rearward, thereby increasing the effective length thereof, the length of the second exhaust pipe 28 can be equalized to the length of the first exhaust pipe 24 though the second exhaust pipe 28 is positioned in the rear of the vehicle body, whereby the discharge resistances in the first and second exhaust pipes can be equal to each other.

Further since the first and second exhaust pipes 24 and 28 are jointed together in the rear of the vehicle body, they can be sufficiently long and accordingly exhaust interference between the exhaust gas discharged by the cylinders in the first cylinder row and that discharged by the cylinders in the second cylinder row can be substantially suppressed, whereby the exhaust gas can smoothly flow through the exhaust pipes.

Further since the first exhaust pipe 24 is passed through the recess 32 of the oil pan 30 and the bight portion 34 of the second exhaust pipe 28 is disposed in the recess 32, the exhaust pipes 24 and 28 can be compactly laid out and a large road clearance can be obtained for their lengths.

Further when the first exhaust pipe 24 and the bight portion 34 of the second exhaust pipe 28 in the recess 34 of the oil pan 30, the engine lubricant accumulating in the bottom of the oil pan 30 can be away from the first exhaust pipe 24 and the bight portion 34 of the second exhaust pipe 28 which are heated to a very high temperature, whereby deterioration by heat of the engine lubricant can be prevented.

Further, in this particular embodiment, since the first exhaust pipe 24 and the second exhaust pipe 28 are communicated with each other by way of the communicating pipe 42 in the recess 32, exhaust noises in the first and second exhaust pipes 24 and 28 interfere with each other and are greatly suppressed.

Though, in the embodiment described above, the exhaust system of the present invention is applied to a V-type engine, the exhaust system of the present invention can also be applied to a horizontally opposed engine.

What is claimed is:

1. An exhaust system for an engine which has first and second cylinder rows substantially parallel to each other and is mounted sideways so that the cylinder rows are arranged side by side in the longitudinal direction of the vehicle body with the first cylinder row disposed forward of the second cylinder row, the exhaust system comprises a first exhaust pipe which is connected to the cylinders in the first cylinder row on the front side of the first cylinder row and is led rearward of the engine through a recess formed on the lower side of an oil pan of the engine which is positioned between the first and second cylinder rows, and a second exhaust pipe which is connected to the cylinders in the second cylinder row on the rear side of the second cylinder row, is once led forward into the recess of the oil pan and then turned rearward in the recess to extend rearward, the first and second exhaust pipes being merged into a common exhaust pipe at a junction in the rear of the engine.

2. An exhaust system as defined in claim 1 further comprising an communicating passage which communicates the first and second exhaust pipes with each other at a portion upstream of the junction.

3. An exhaust system as defined in claim 2 in which said communicating passage is disposed in the recess.

4. An exhaust system as defined in claim 1 in which said first exhaust pipe is connected to the cylinders in the first cylinder row by way of a first exhaust manifold which has a plurality of discrete exhaust passages each connected to one of the cylinders in the first cylinder row, and said second exhaust pipe is connected to the cylinders in the second cylinder row by way of a second exhaust manifold which has a plurality of discrete exhaust passages each connected to one of the cylinders in the second cylinder row.

5. An exhaust system as defined in claim 4 in which the effective length of the first exhaust pipe between the junction of the first and second exhaust pipes and the junction of the first exhaust pipe to the first exhaust manifold is substantially equal to that of the second exhaust pipe between the junction of the first and second exhaust pipes and the junction of the second exhaust pipe to the second exhaust manifold.

* * * * *